Patented May 16, 1933

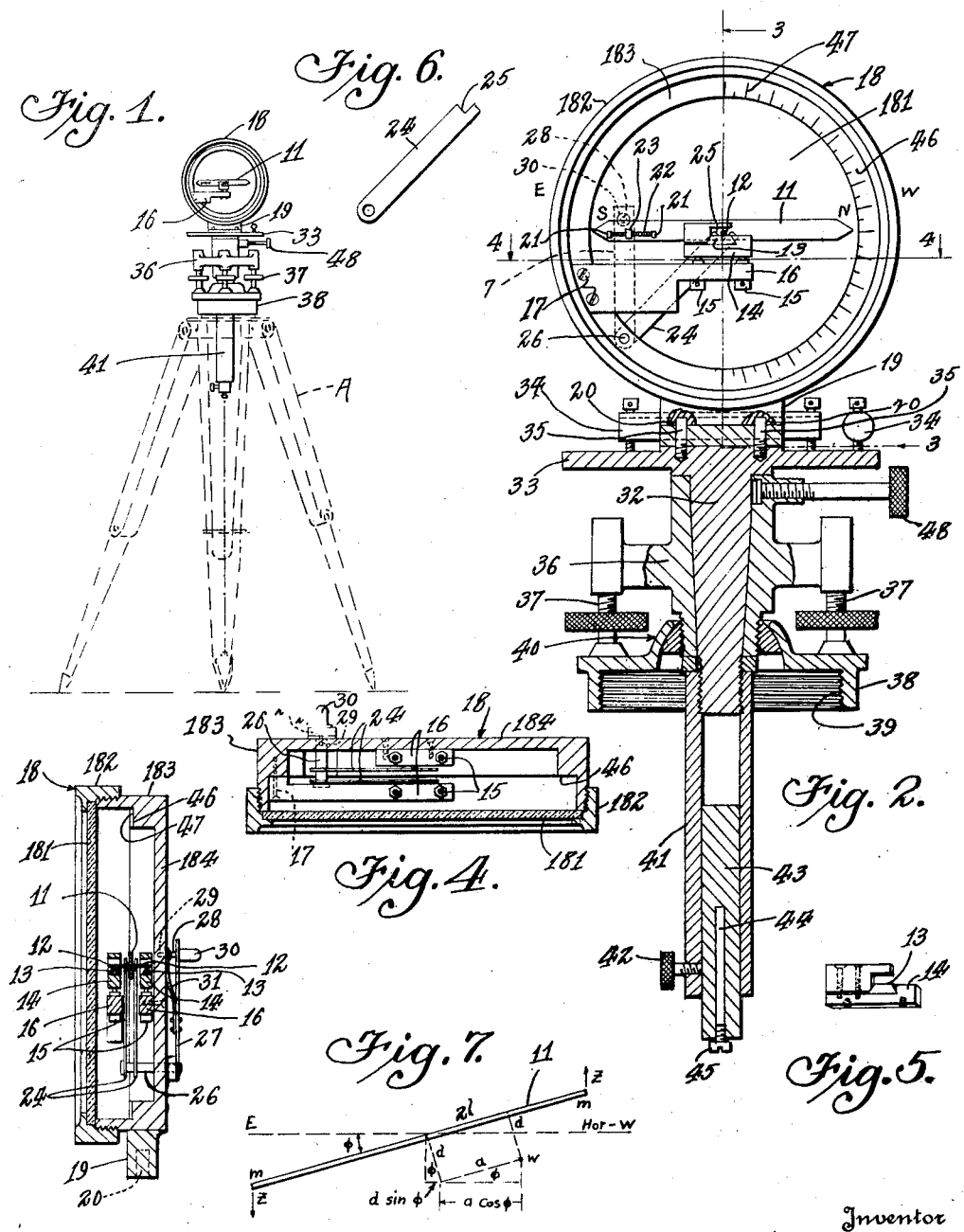

1,909,619

UNITED STATES PATENT OFFICE

HENRY N. HERRICK, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

MEASURING INSTRUMENT

Application filed February 24, 1930. Serial No. 430,706.

This invention relates to a measuring instrument and, more especially, to instruments of the type employed for measuring the intensity of the vertical component of the earth's magnetic field.

One of the most important objects of the invention is to disclose and provide an electrical measuring instrument for measuring the intensity of the vertical component of the earth's magnetic field, the instrument of this invention being characterized by an extremely high sensitiveness.

Another important object is to make it possible to read the instrument without the necessity of using a microscope.

Another important object is to secure a relatively large deflection of the magnetic needle so that the reading can be accomplished with the naked eye.

Another object is to provide an instrument that, though exceedingly sensitive, is not readily injured by handling and, accordingly, there is no necessity of extra care in handling of the instrument.

Another exceedingly important object is to provide a construction and arrangement of parts in a magnetic measuring instrument which will insure almost perfect compensation for the effects of temperature changes on the field strength of the magnetic needle.

Further objects and advantages will appear in the subjoined detailed description.

The accompanying drawing illustrates the invention:

Figure 1 is a side elevation of a measuring instrument constructed in accordance with the provisions of this invention, a support for said instrument being indicated in broken lines.

Fig. 2 is an enlarged elevation of the instrument, showing a portion thereof in vertical midsection, the plane of the section being parallel to the plane of Fig. 1.

Fig. 3 is a vertical section on the line indicated by 3—3, Fig. 2.

Fig. 4 is a horizontal section on the line indicated by 4—4, Fig. 2.

Fig. 5 is a perspective view of one of the pivot supports.

Fig. 6 is a side elevation of one of the lifting arms.

Fig. 7 is a diagrammatic view illustrating the method of computing with this instrument the intensity of the vertical component of the earth's magnetic field.

Referring to the drawing, there is provided a magnetic needle 11 mounted to swing in a vertical plane. Projecting from opposite sides of the needle 11 are cylindrical pivots or shafts 12. The magnetic needle is relatively long and light in weight in contradistinction to the relatively short heavy needles used in prior instruments of this type. The pivots 12 rest freely upon suitable supports which, in this instance, include a pair of parallel knife edges 13 positioned at right angles to the pivots 12 and disposed on opposite sides of the vertical plane in which the needle swings.

It is customary to make the knife edges of quartz, or other suitable material, that is extremely hard and not readily oxidized or corroded.

The knife edges 13 are mounted on members 14, into the lower faces of which are screwed leveling screws 15. The leveling screws are supported by brackets 16 which are secured by fastening means 17 to a compass case 18.

The case 18 includes a transparent front wall 181 of glass or other suitable material held in place, in this instance, by a ring 182 which is screwed onto a cylindrical housing member 183 which has a back wall 184. The ring and the housing are made of nonmagnetic material. The bottom of the housing is provided with a downwardly projecting member 19 provided with vertical sockets 20.

An adjustable counterweight is carried by the magnetic needle 11, at a point relatively far removed from the pivots 12 and this may be accomplished by securing to one side of the needle by laterally projecting lugs 21 a screw 22 on which is threaded the counterweight 23. The screw 22 is parallel to the longitudinal axis of the needle and slightly below the gravity axis of the needle. The end of the needle on which the screw 22 is mounted depends upon whether the instrument is to be used in the Northern or Southern hemisphere.

If the instrument is to be used in the Northern hemisphere, the screw is placed near the south-seeking end of the needle, and if the instrument is to be used in the Southern hemisphere the screw will be placed near the north-seeking end of the needle. It is important that the counterweight be placed near the end of the needle instead of near the fulcrum thereof, as is done in prior instruments of this type, for the reason that this secures great sensitivity of the instrument. The placing of the counterweight slightly below the gravity axis of the needle permits the use of a simple formula in computing the force of the vertical component of the earth's magnetic field, as will be explained hereinafter. If the counterweight were placed on the axis of the needle then, in the diagram shown in Fig. 7, the distance $d$ of the counterweight from the axis of the needle would be zero, and the solution of the equation $$\tan \phi \frac{MZ - Wa}{Wd}$$

would be infinity, since $W$ times $d = W$ times zero $=$ zero, and $MZ - Wa$ divided by zero is infinity. The housing member 183 is provided internally with an annular face 46 which is graduated in degrees and parts of degrees of angular measurement, as indicated at 47, thus affording a means for visibly indicating to the naked eye the angular movement of the needle.

A suitable means is provided for effecting adjustment of the magnetic needle in relation to the knife edges 13 and for this purpose there is provided a pair of parallel lifting arms 24 provided with notches 25 in their upper ends to receive the pivots 12. The lower ends of the lifting arms 24 are rigidly connected to a shaft 26 that is positioned at right angles to said arms. The shaft 26 is rotatably and slidably mounted in the rear case wall 184 and an operating lever 27 is connected to the projecting outer end of the shaft 26 at right angles to said shaft. The lever 27 is provided at its free end with a pin 28 adapted to seat in a hole 29 in the rear case wall 184 so as to lock the lever 27 against movement. The hole 29 is positioned so that, when the pin 28 is seated therein, the arms 24 will be swung downwardly out of engagement with the pivots 12. The pin 28 is mounted to slide through the lever 27 and is provided on its outer end with a handle 30. The pin 28, in this instance, is yieldingly held in locking position by a spring 31 which is secured at one end to the lever 27 and at its other end to the pin 28.

To effect adjustment of the needle pivots 12 on the knife edges 13, the operator will release the lever 27 and swing it into position to cause the notches 25 of the arms 24 to engage the pivots 12 and lift said pivots off of the knife edges. The lever 27 will then be moved toward or away from the compass case, thus sliding the shaft 26 and, accordingly, moving the arms 24 horizontally sufficient to center the magnetic needle with respect to its supports.

The compass case is adjustably supported by any suitable means which, though not constituting the essence of the invention, may be briefly described for the purpose of aiding in an understanding of the method of using the instrument. The supporting means for the compass case includes a vertical spindle 32 provided at its upper end with a horizontal plate 33 on which are mounted leveling vials 34. Projecting upwardly from the plate 33 is a pair of studs 35 which, in this instance, are screwed into said plate in position to be received in the sockets 20 of the compass case, thus holding the compass case with the needle in position to swing vertically. The spindle 32 is supported by a suitable leveling means which, in this instance, comprises a bearing 36 for the spindle, leveling screws 37 screwed into the bearing 36, and a cylindrical member 38 on which the lower ends of the screws 37 are rotatably mounted. In this instance the member 38 is provided with screw threads 39 so that it may be readily attached to a suitable support such as, for example, the head of a tripod which is indicated in broken lines at A. The bearing 36 has a swivel connection 40 with the member 38 so as to admit of universal adjustment by appropriate turning of the screws 37.

The lower end of the spindle 32 is provided with a tubular extension 41 in which is clamped by a screw 42 a tubular magnet holder 43. The bore of the holder 43 is provided with an auxiliary bar magnet 44, the lower end of said bore being closed by a screw 45.

The magnet holder 43 may be adjusted up or down, with reference to the compass needle, by loosening the clamping screw 42. When the instrument is to be used in the Northern hemisphere, the auxiliary magnet 44 will be placed with its north-seeking end up, and when the instrument is to be used in the Southern hemisphere said auxiliary magnet will be positioned with its south-seeking end up.

The above described instrument is used as follows: The magnet case 18 will be removed from the studs 35 and in place thereof there will be positioned an ordinary magnetic compass, not shown. The case of this ordinary compass may be provided with sockets to receive the studs and the position of the sockets will be such that they will be in alinement with the east-west points on the compass card. The plate 33 is oriented by turning it until the needle of the ordinary compass is in the north-south positions with respect to the compass card, thus causing the studs 35 to be in the east-west position or, in other words, in a plane that is at a right angle to the magnetic meridian. The spindle 11 is then clamped by a clamping screw 48 which is mounted in the bearing 36. Then the ordinary magnetic compass is removed from the studs without moving the plate 33 from the position into which it has been adjusted as just described.

The compass case 18 will then be placed on the studs 35 and the plane of revolution of the needle 11 will then be at right angles to the magnetic meridian. Since the plane of rotation of the needle is east-west, the horizontal component of the earth's magnetic field does not affect the inclination of the needle and, accordingly, the needle, if unweighted, would stand vertically with its north-seeking end pointing down. However, the needle is caused to assume a horizontal position by the combined effects of the counterweight 7 and the proximity of the north-seeking end of the auxiliary magnet 44. The counterweight tends to pull the south arm of the needle down while the auxiliary magnet 44 tends to push the north end of the needle up and pull the south end of the said needle down. By adjusting the counterweight along the screw 22 and moving the auxiliary magnet up or down, the magnetic needle can be caused to swing into an exactly horizontal position.

It is to be noted, particularly, that the auxiliary magnet 44 is used not only to assist in bringing the magnetic needle to a horizontal position, but also to compensate for the effects of temperature changes that would otherwise adversely affect the swinging magnetic needle.

In so far as adjusting of the needle to the horizontal position is concerned, it does not matter which end of the auxiliary magnet is up. I have discovered, however, that if the auxiliary magnet, which has the same temperature coefficient of field strength as the needle is used with that end up which opposes the earth's magnetic field, the effect of fluctuations in magnetic intensity in the magnetic needle that are caused by temperature changes is amost entirely eliminated. In the Northern hemisphere, the north-seeking end of the auxiliary magnet 44 would be placed uppermost. In the Southern hemisphere, the south-seeking end of the auxiliary magnet would be placed uppermost. These conditions will cause the magnetic lines of force of the auxiliary magnet to oppose the magnetic lines of force of the earth's field, as will be easily understood. With rising temperatures the strength of the magnetic needle decreases and, accordingly, the inclination of the needle would decrease if the moment of the counterweight and the earth's magnetic field remained constant, but with the arrangement hereinbefore described, the effect of the earth's magnetic field on the magnetic needle 11 is reduced by the effect of the opposing auxiliary magnet 44. With rising temperatures, the strength of the auxiliary magnet is lessened at the same rate as that of the magnetic needle and, accordingly, the effective force on the magnetic needle, which is the difference between the effect of the earth's magnetic field and the effect of the magnetic field of the auxiliary magnet, is thereby increased, thus compensating for weakening of the magnet field of the swinging magnetic needle.

It is not necessary to the operation of the instrument that the auxiliary magnet be placed below the magnetic needle, but such construction is preferable for convenience in construction and adjustment. However, it is important that the auxiliary magnet be positioned in vertical alinement with the needle pivot and with that end, that opposes the earth's magnetic field, turned upward.

By careful adjustments of the counterweight and auxiliary magnet, it is possible to substantially eliminate fluctuation due to temperature changes. It is important in making these adjustments that the auxiliary magnet be placed with the proper end uppermost, otherwise fluctuations of as much as 200 gammas or even more may occur because of temperature variations. Since the normal intensity of the earth's magnetic field varies from north to south, it is advisable to have several auxiliary magnets of different known moments so as to make it possible to compensate for the normal effect of the earth's magnetic field when the instrument is positioned in places having different latitudes.

The instrument is calibrated, before using, by the employment of a special reference magnet of known moment placed below the auxiliary magnet at a known distance vertically below the magnetic needle. Since this method of calibrating instruments of this type is widely employed, it is not necessary to describe such method in detail herein.

After the instrument has been set up and calibrated, the deflection in degrees of the magnetic needle is noted. The instrument is then set up at another location and the deflection in degrees of the magnetic needle again noted. The difference in the vertical components of the earth's magnetic field at the two locations is computed as follows, referring to Fig. 7 of the drawing:

Let:

M = magnetic moment of the swinging magnetic needle 11 (this is equal to $2lm$).

W = weight of the counterweight 23 (gm. × 980 = dynes).

$a$ = distance from center of gravity of counterweight to axis of cylindrical pivots 12 measured parallel to the center line of the magnetic needle 11.

$d$ = distance from center of gravity of counterweight to the center line of the magnetic needle 11.

Z = vertical intensity of the earth's magnetic field at one location.

Z' = vertical intensity of the earth's magnetic field at a different location.

$m$ = pole strength of the magnetic needle 11.

$2l$ = length of magnetic needle 11.

$\phi$ = dip of the magnetic needle 11 due to the vertical intensity Z.

$\phi'$ = dip of the magnetic needle 11 due to the vertical intensity Z'.

Then $$ZM \cos \phi = W(d \sin \phi + a \cos \phi)$$
$$ZM \cos \phi - Wa \cos \phi = Wd \sin \phi$$
$$ZM - Wa = Wd \frac{\sin \phi}{\cos \phi} = Wd \tan \phi$$
$$\tan \phi = \frac{MZ - Wa}{Wd}$$

At another point, where the vertical intensity of the earth's magnetic field = Z', the dip indicated will be $\phi'$, therefore:

$$\tan \phi' = \frac{MZ' - Wa}{Wd}$$

and:

$$\tan \phi' - \tan \phi = \frac{MZ' - Wa}{Wd} - \frac{MZ - Wa}{Wd} = \frac{M(Z' - Z)}{Wd}$$

The anomaly, or variation in the intensity of the normal vertical component of the earth's magnetic field, due to local physical features of the earth's structure will be:

$$Z' - Z = \frac{Wd}{M}(\tan \phi' - \tan \phi).$$

In using the formula given above, it is not necessary to determine by actual measurement the distances $d$ and $a$.

By calibrating the instrument with an auxiliary magnet of known moment, as explained above, there can be determined the value of $$\frac{Wd}{M}$$

which is used as a constant in further measurements with the instrument so long as the position of the counterweight is not changed.

I claim:

1. A magnetic measuring instrument comprising a fixed support for a magnetic needle, a magnetic needle pivoted to swing freely in a vertical plane on said support, and a counterweight on the needle near one end of the same and below a line which passes through the center of gravity and is parallel to the longitudinal axis of said needle.

2. A magnetic measuring instrument comprising a fixed support for a magnetic needle, a magnetic needle pivoted to swing freely in a vertical plane on said support, and a counterweight on the needle near one end thereof and below a line which passes through the center of gravity and is parallel to the longitudinal axis of said needle, said counterweight being adjustable lengthwise of the needle.

3. A magnetic measuring instrument comprising a fixed support for a magnetic needle, a magnetic needle on said support and pivoted to swing freely in a vertical plane, a counterweight on the needle below a line which passes through the center of gravity and is parallel to the longitudinal axis of the needle, and an auxiliary magnet in spaced relation and vertical alignment with the pivot, said auxiliary magnet having the end that opposes the earth's magnetic field where the instrument is positioned pointing toward the needle.

4. A magnetic measuring instrument comprising a case, pivot supporting means within the case, a magnetic needle provided with a pivot resting on said support so that the needle will swing in a vertical plane at right angles to a magnetic meridian, a counterweight on the needle nearer one end of the needle than the pivot thereof and adjustable longitudinally of the needle, means for visibly indicating to the naked eye the angular movement of the needle with respect to the case, and a vertically adjustable auxiliary magnet in spaced relation and vertical alinement with the needle support, said auxiliary magnet having the end that opposes the earth's magnetic field where the instrument is positioned pointing toward the needle.

5. A magnetic measuring instrument comprising a magnetic needle pivoted on fixed horizontal pins and adapted to swing in a fixed vertical plane, with respect to the instrument, a longitudinally directed shaft carried by said needle near one end thereof, said shaft lying below a line through the center of gravity and parallel to the longitudinal axis of the needle, said shaft carrying a counterweight movable thereon longitudinally with respect to the needle.

6. A magnetic measuring instrument comprising a magnetic needle pivoted on fixed horizontal pins and adapted to swing in a fixed vertical plane with respect to the instrument, a longitudinally directed shaft carried by said needle near one end thereof, said shaft lying below a line through the center of gravity and parallel to the longitudinal axis of the needle, said shaft carrying a counterweight movable thereon longitudinally with respect to the needle, and an auxiliary magnet in spaced relation and in vertical alignment with the pivot of said needle, said auxiliary magnet having that pole which opposes the earth's magnetic field where the instrument is positioned, pointing towards the needle.

Signed at San Francisco California, this 18th day of February 1930.

HENRY N. HERRICK.